Figure 1:
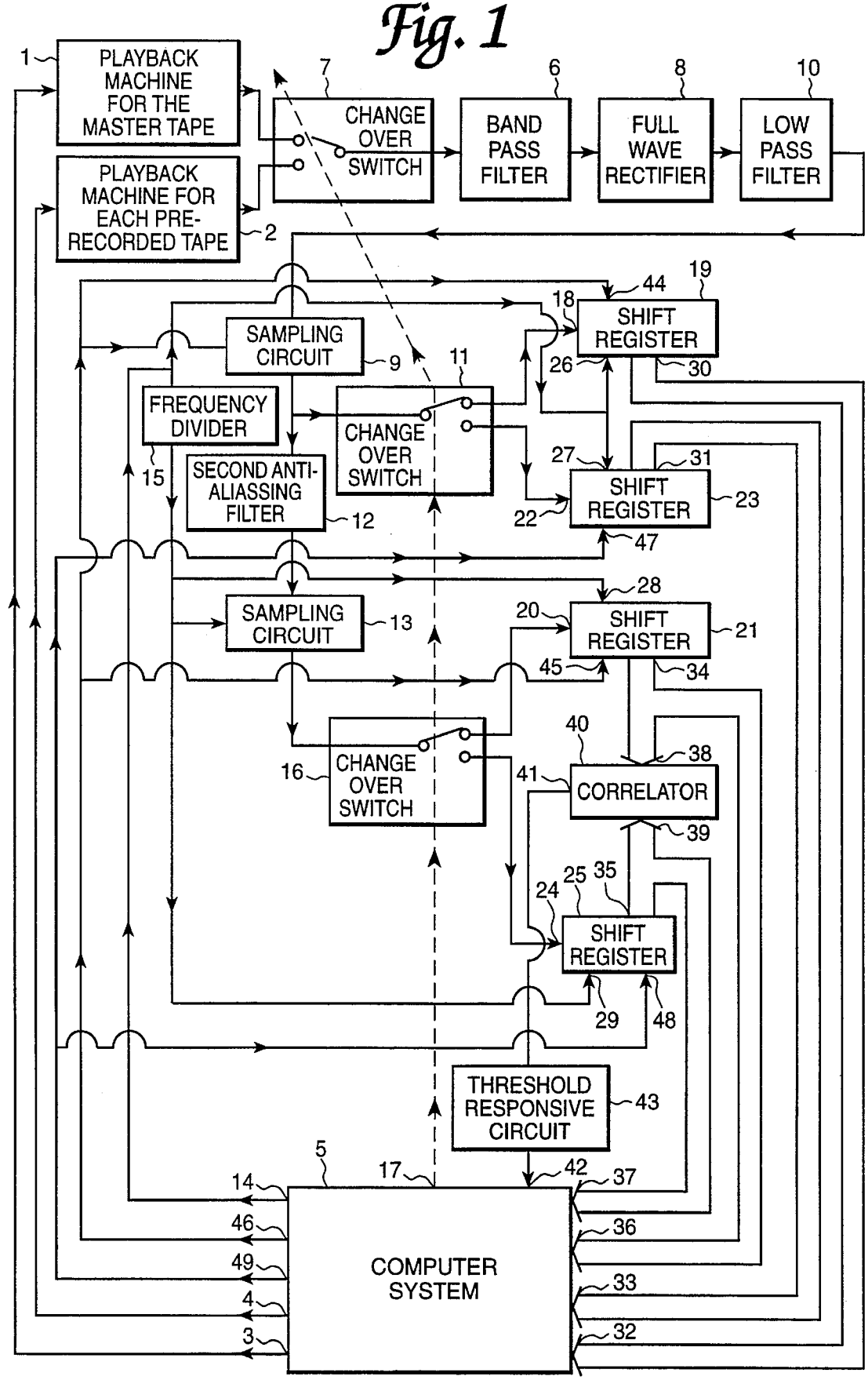

United States Patent [19]
Clemow

[11] Patent Number: 5,623,431
[45] Date of Patent: Apr. 22, 1997

[54] ALIGNING A GIVEN SIGNAL WITH A CORRESPONDING REFERENCE SIGNAL

[75] Inventor: Richard Clemow, Gerrards Cross, Great Britain

[73] Assignee: Central Research Laboratories Limited, Middlesex, England

[21] Appl. No.: 290,909

[22] PCT Filed: Feb. 24, 1993

[86] PCT No.: PCT/GB93/00381

§ 371 Date: Aug. 19, 1994

§ 102(e) Date: Aug. 19, 1994

[87] PCT Pub. No.: WO93/17427

PCT Pub. Date: Sep. 2, 1993

[30] Foreign Application Priority Data

Feb. 24, 1992 [GB] United Kingdom ............... 9203911

[51] Int. Cl.⁶ ..................................................... G06J 1/00
[52] U.S. Cl. ........................................................ 364/604
[58] Field of Search ............................... 364/604, 728.03

[56] References Cited

U.S. PATENT DOCUMENTS

| | | |
|---|---|---|
| 3,919,479 | 11/1975 | Moon et al. . |
| 4,547,864 | 10/1985 | Kawabata ................................. 364/604 |
| 4,813,006 | 3/1989 | Burns et al. ............................. 364/604 |
| 4,823,293 | 4/1989 | Oda ......................................... 364/604 |
| 5,040,081 | 8/1991 | McCutchen ............................. 360/14.3 |

FOREIGN PATENT DOCUMENTS

| | | |
|---|---|---|
| 309639 | 9/1982 | European Pat. Off. . |
| 2226718 | 7/1990 | United Kingdom . |
| 2239976 | 7/1991 | United Kingdom . |

OTHER PUBLICATIONS

Komiyama, "Tape–Lock Systems without Time Code", NHK Lab. Note, No. 305, Sep. 1984, Tokyo Japan, pp. 2–7.

*Primary Examiner*—Tan V. Mai
*Attorney, Agent, or Firm*—Keck, Mahin & Cate

[57] ABSTRACT

A segment of a given signal is aligned with a corresponding reference segment by passing the reference segment through a full-wave rectifier (8), an anti-alias filter (10) and a first sampler (9), and storing the result in a first register (19). The output of the first sampler (9) is moreover passed through a second anti-alias filter (12) and a second sampler (13) which samples at a lower rate, and the result is stored in a second register (21). The given signal is then subjected to the same process with the exception that the output signals of the first (9) and second (13) samplers are passed continuously through first (23) and second (25) shift registers respectively until a correlator (40) indicates at least a predetermined degree of correlation between the contents of the second register (21) and the second shift register (25). A sliding correlation is then performed between the contents of the first register (19) and the first shift register (23) to determine the position of the correlation peak. The alignment process may be used when it is required to compare a segment of an audio signal recorded on a magnetic tape with the corresponding segment recorded on a master tape.

6 Claims, 2 Drawing Sheets

ALIGNING A GIVEN SIGNAL WITH A CORRESPONDING REFERENCE SIGNAL

This invention relates to a method of detecting a segment of a given signal which corresponds to a reference segment, the method comprising rectifying the reference segment, deriving a first auxiliary reference segment from the rectified reference segment by anti-alias filtering and sampling at a first rate, storing said first auxiliary reference segment, rectifying the given signal, deriving a first signal from the rectified given signal by anti-alias filtering and sampling at said first rate, and performing a sliding correlation between said first signal and the stored first auxiliary reference segment to determine which segment of said first signal has at least a predetermined degree of correlation with said first auxiliary reference segment.

A method of this general kind is disclosed in U.S. Pat. No. 3,919,479. This known method is used for automatically recognising and identifying programmes and commercial advertisements broadcast on television and radio.

A method of aligning a segment of a given signal with a corresponding reference segment is disclosed, for example, in published European patent application EP-A-0309639. This known method is used inter alia in the evaluation of the quality of recording on a magnetic tape containing audio and video programme material. Characteristics of a selected segment of the audio material recorded are measured both upon recording and upon playback, and are compared one with the other, thereby indicating the quality of the recording. Obviously for this process to be successful it is necessary that the segment of played back material corresponds substantially exactly to the segment whose characteristics were measured upon recording. In order to ensure such correspondence in the known method, a picture frame number forming part of the video material recorded is used as a marker indicating the start of the audio segment to be evaluated upon playback.

Such picture frame numbers or an equivalent timecode track may not be available in some applications. It is, in theory, possible to record dedicated markers within the audio track(s). However, it is difficult to make such markers imperceptible to the end user of the tape. It is an object of the present invention to make the provision of markers unnecessary.

The invention provides a method as defined in the first paragraph hereof which is characterized in that the method further comprises deriving a second auxiliary reference segment from the rectified reference segment by anti-alias filtering and sampling at a second rate, the second rate being greater than the first rate, storing said second auxiliary reference segment, deriving a second signal from the rectified given signal by anti-alias filtering and sampling at said second rate, and performing a sliding correlation between at least a subsegment of the stored second auxiliary reference segment and at least a subsegment of that segment of said second signal which corresponds to said segment of said first signal to determine the position of the peak correlation therebetween and thereby align the segment of the given signal with the reference segment.

Figure 2:
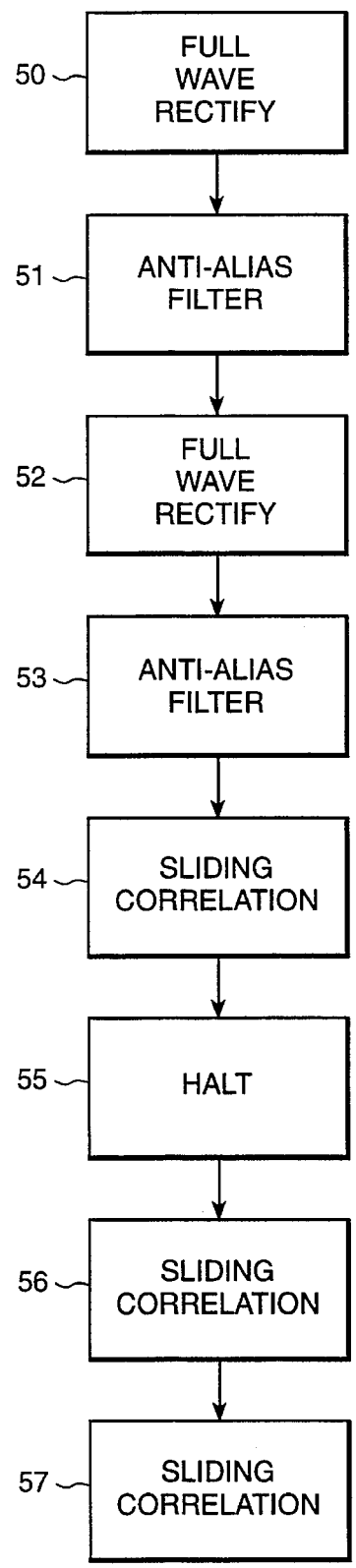

An embodiment of the invention will now be described, by way of example, with reference to the accompanying diagrammatic drawing in which FIG. 1 is a block diagram of an apparatus in accordance with the invention and FIG. 2 is a flow diagram of various operations performed by the apparatus of FIG. 1.

FIG. 1 is a block diagram of apparatus in accordance with the invention which, in the present example, is intended to facilitate evaluation of the quality of prerecorded audio tapes. To this end a segment of the signal recorded on each tape to be evaluated is played back and, after suitable processing, is compared with a corresponding segment, also suitably processed, played back from a master tape.

In the apparatus of the Figure reference numeral 1 denotes a playback machine for the master tape and reference numeral 2 denotes a playback machine for each prerecorded tape to be evaluated. The machines 1 and 2 are independently controllable by signals produced at outputs 3 and 4 respectively of a suitably programmed data processing or computer system 5, their output signals being fed as alternatives to a bandpass filter 6 by a changeover switch 7. The output signal of filter 6 is full-wave-rectified by means of a full-wave rectifier 8 and the envelope signal resulting from the rectification process is sampled by means of a sampling circuit 9 after being filtered by means of an anti-aliassing low-pass filter 10. The output signal of the sampling circuit 9 is fed both to a changeover switch 11 and, via a second anti-aliassing filter 12, to a second sampling circuit 13.

Sampling circuit 9 is controlled by clock signals produced at an output 14 of system 5, these clock signals also being reduced in frequency by a factor n in a frequency divider 15 and the result used to control sampling circuit 13. The digital signal appearing at the output of sampling circuit 9 is thus subsampled by circuit 13, the subsampling factor being n. This subsampled signal is fed to a changeover switch 16.

Changeover switches 7, 11 and 16 are controlled in synchronism by a signal produced at an output 17 of system 5. When these switches are in the positions shown the output signal of the playback machine 1 for the master tape is coupled to the sampling circuit 9 via the circuit components 6, 7, 8 and 10, the output signal of sampling circuit 9 is coupled to the data input 18 of a shift register 19, and the output signal of sampling circuit 13 is coupled to the data input 20 of a shift register 21. When the switches 7,11 and 16 are in their other position the output signal of the playback machine 2 for the tapes to be evaluated is coupled to the sampling circuit 9 via the circuit components 6,7,8 and 10, the output signal of sampling circuit 9 is coupled to the data input 22 of a buffer store in the form of a shift register 23, and the output signal of sampling circuit 13 is coupled to the data input 24 of a buffer store in the form of a shift register 25. Clock signal inputs 26 and 27 of shift registers 19 and 23 respectively are fed with the clock signals generated at the output 14 of system 5, and clock signal inputs 28 and 29 of shift registers 21 and 25 respectively are fed with the output signal of frequency divider 15.

Parallel data outputs 30 and 31 of shift registers 19 and 23 respectively are coupled to data input ports 32 and 33 respectively of system 5, and parallel data outputs 34 and 35 of shift registers 21 and 25 respectively are coupled to data input ports 36 and 37 respectively of system 5. The parallel data outputs 34 and 35 are also coupled to respective data inputs 38 and 39 of a correlator 40. The output 41 of correlator 40 is coupled to an interrupt signal input 42 of system 5 via a threshold responsive circuit 43. Shift inhibit signal inputs 44 and 45 of shift registers 19 and 21 respectively are fed from an output 46 of system 5 and shift inhibit inputs 47 and 48 of shift registers 23 and 25 respectively are fed from an output 49 of system 5.

System 5 is programmed so that, in operation, it first inhibits shift registers 23 and 25 by means of a signal at its output 49, controls switches 7,11 and 16 to the positions shown by means of a signal at its output 17, and activates the playback machine 1 for the master tape by means of a signal at its output 3, maintaining this situation for, for example, ten seconds. A ten-second segment of the audio signal recorded on the master tape is therefore bandpass filtered at 6, full-wave-rectified at 8, anti-aliassing filtered at 10, sampled at 9, and the sampling result is stored in shift register 19. The sampling result is moreover anti-aliassing filtered at 12, subsampled at 13, and the subsampling result is stored in shift register 21.

System 5 then deactivates machine 1 by means of a signal at its input 3, activates the playback machine 2 for a tape to be evaluated by means of a signal at its output 4, inhibits shift registers 19 and 21 by means of a signal at its output 46 releases shift registers 23 and 25 by means of a signal at its output 49, and controls switches 7,11 and 16 to their other positions by means of a signal at its output 17. The audio signal from the tape to be evaluated is therefore processed in the same way as was the signal from the master tape, with the exception that the samples and subsamples from the circuits 9 and 13 respectively are stored in shift registers 23 and 25 respectively, rather than shift registers 19 and 21. This situation continues until correlator 40 produces an output signal which exceeds the threshold of circuit 43 (indicating substantial correlation between the contents of shift registers 21 and 25 and hence that the passage currently being played back from the tape to be evaluated corresponds to the passage originally played from the master tape). At this point threshold-responsive circuit 43 applies an interrupt signal to input 42 of system 5. System 5 responds by inhibiting the shift registers 23 and 25 by means of a signal at its output 49.

System 5 then performs a sliding correlation routine on the contents of the shift registers 21 and 25 (present at its data ports 36 and 37) to estimate the position of the correlation peak as accurately as possible (to a fraction of one subsample contained in register 25), this being done by fitting a curve to the correlation data. This provides an estimate of the amount (number of subsamples plus a fraction thereof) by which the subsample data in register 25 is offset relative to the subsample reference data in register 21. System 5 then multiplies this amount by n to produce an estimate of the number of subsamples by which the subsample data in register 23 is offset with respect to the reference subsample data present in register 19, and thereafter performs a sliding correlation routine on at least corresponding segments of these two sets of data (present at data input ports 33 and 32 respectively) within a window centered on this estimated offset to produce a more accurate estimate of the position of the correlation peak and hence of this offset.

Once this stage is reached subsequent operations will depend on the criteria by which the tape in machine 2 is to be assessed. If, for example, it is required merely to assess the speed accuracy attained when this tape was recorded, then system 5 may be programmed to repeat the last-mentioned sliding correlation routine for various pairs of corresponding sub-segments of the data present at the input ports 33 and 32 to ascertain how the offset varied (if at all) during the course of the segment of audio signal represented by this data. If on the other hand actual comparison of e.g. the frequency response characteristics of the master tape and the tape being assessed is required then the two sets of data may be shifted relative to each other to reduce the offset substantially to zero and thereby ensure that excerpts from the two tapes which correspond to each other substantially exactly are compared. Having done this a fast Fourier transform (FFT) may be implemented for a corresponding segment of each set, enabling the spectral characteristic of the two to be compared with each other.

If desired, more degrees of subsampling may be provided for by providing at least one further filter/sampling circuit similar to the circuit 10,9, together with an associated divider-by-n similar to divider 15 and shift registers similar to registers 19 and 23, between sampling circuit 9 and filter 12. If this is done then the segment offset can be determined to successive degrees of accuracy by processing in turn the data with the coarsest sampling rate through to the data with the highest sampling rate.

In one embodiment n was chosen to be equal to sixteen and two dividers-by-n and associated sampling circuits were provided. A ten second segment of audio signal was stored in the form of 32768 samples in registers 19 and 23, in the form of 2048 samples in the further pair of shift registers provided, and in the form of 128 samples in the shift registers 21 and 25.

It will be evident that various modifications may be made to the embodiment described within the scope of the invention defined by the claims. For example, the input to filter 12 may be derived direct from the rectifier 8 rather than from the sampler 9.

FIG. 2 is a flow diagram of various operations performed by the apparatus of FIG. 1. In FIG. 2 the various blocks have the following significances.

50—Full wave rectify at 8 a reference segment in the form of a ten-second segment of the audio signal recorded on the master tape.

51—Anti-alias filter the result of step 50 at 10, sample the result at a first rate at 9, and store the samples as a first auxiliary reference segment in 19; anti-alias filter the samples from 9 at 12, sample the output of filter 12 at a second lower rate at 13, and store the samples as a second auxiliary reference segment in 21.

52—Full wave rectify at 8 a given signal in the form of an output signal from a tape to be evaluated.

53—Anti-alias filter the result of step 52 at 10 and sample the result at the first rate at 9 to produce a first signal; anti-alias filter the samples from 9 at 12, and sample the output of filter 12 at the second rate at 13 to produce a second signal.

54—Perform a sliding correlation at 40 between the second signal passing through shift register 25 and the second auxiliary reference segment stored in register 21 until correlator 40 produces an output signal indicating that the segment of the second signal currently in register 25 has at least a predetermined degree of correlation with the second auxiliary reference segment stored in register 21.

55—Halt the passage of the first and second signals through the shift registers 23 and 25 respectively.

56—Perform at 5 a sliding correlation between the current contents of the second buffer memory register 25 and the second auxiliary reference segment in register 21 and calculate the correlation function therebetween to indicate the position of the peak correlation to within a fraction of a sample period at the second rate.

57—Perform at 5 a sliding correlation between at least a subsegment of the first auxiliary reference segment stored in register 19 and at least a subsegment of the segment of the first signal currently present in the first buffer memory register 23 to determine the position of the peak correlation therebetween.

I claim:

1. A method of detecting a segment of a given signal which corresponds to a reference segment, the method comprising rectifying the reference segment, deriving a first auxiliary reference segment from the rectified reference segment by anti-alias filtering and sampling at a first rate, storing said first auxiliary reference segment, rectifying the given signal, deriving a first signal from the rectified given signal by anti-alias filtering and sampling at said first rate, and performing a sliding correlation between said first signal and the stored first auxiliary reference segment to determine which segment of said first signal has at least a predetermined degree of correlation with said first auxiliary reference segment, characterized in that the method further comprises deriving a second auxiliary reference segment from the rectified reference segment by anti-alias filtering and sampling at a second rate, the second rate being greater than the first rate, storing said second auxiliary reference segment, deriving a second signal from the rectified given signal by anti-alias filtering and sampling at said second rate, and performing a sliding correlation between at least a subsegment of the stored second auxiliary reference segment and at least a subsegment of that segment of said second signal which corresponds to said segment of said first signal to determine the position of the peak correlation therebetween and thereby align the segment of the given signal with the reference segment.

2. A method as claimed in claim 1, wherein the first and second signals are passed through first and second buffer memories respectively which in consequence contain segments of the first and second signals respectively at any given time, the passage through the buffer memories being halted upon determination that at least said predetermined degree of correlation exists between the current contents of the first buffer memory and said first auxiliary reference segment.

3. A method as claimed in claim 2 wherein, upon halting of the passage through the buffer memories, the correlation function of the current contents of the first buffer memory with the first auxiliary reference segment is calculated to indicate the position of the peak correlation therebetween to within a fraction of a sample period at said first rate, the sliding correlation performed between at least a subsegment of the stored second auxiliary reference segment and at least a subsegment of that segment of said second signal which corresponds to said segment of said first signal being carried out for a range of relative positions which includes the indicated position of the peak correlation.

4. A method as claimed in claim 3 wherein said range is centered on said indicated position.

5. A method as claimed in claim 2, wherein the sliding correlation performed between at least a subsegment of the stored second auxiliary reference segment and at least a subsegment of that segment of said second signal which corresponds to said segment of said first signal is performed independently between a plurality of subsegments of the stored second auxiliary reference segment and corresponding subsegments of said segment of said second signal.

6. A method as claimed in claim 1, wherein the given signal and the reference segment are bandpass filtered audio signals.

* * * * *